United States Patent [19]

Hara

[11] Patent Number: 4,631,558

[45] **Date of Patent: * Dec. 23, 1986**

[54] INK LIQUID BAFFLE-REGULATED RESERVOIR IN AN INK JET SYSTEM PRINTER

[75] Inventor: Takafumi Hara, Kyoto, Japan

[73] Assignee: Sharp Kabushiki Kaisha, Osaka, Japan

[ * ] Notice: The portion of the term of this patent subsequent to Apr. 16, 2002 has been disclaimed.

[21] Appl. No.: 491,667

[22] Filed: May 5, 1983

[30] Foreign Application Priority Data

May 6, 1982 [JP] Japan ........ 57-76146

[51] Int. Cl.[4] ........ G01D 15/18

[52] U.S. Cl. ........ 346/140 R; 346/75

[58] Field of Search ........ 346/75, 140 R

[56] References Cited

U.S. PATENT DOCUMENTS

| | | | |
|---|---|---|---|
| 3,831,727 | 8/1974 | Krusoe et al. | 197/1 R X |
| 4,190,846 | 2/1980 | Yamamoto et al. | 346/140 R |
| 4,196,625 | 4/1980 | Kern | 73/304 R |
| 4,229,757 | 10/1980 | Tamai | 346/140 R |
| 4,320,406 | 3/1982 | Heinzl | 346/140 R |
| 4,419,678 | 12/1983 | Kasugayama et al. | 346/140 R |
| 4,432,005 | 2/1984 | Duffield et al. | 346/140 R |
| 4,447,820 | 5/1984 | Terasawa | 346/140 R |
| 4,460,906 | 7/1984 | Kanayama | 346/140 R |
| 4,463,362 | 7/1984 | Thomat | 346/140 R |
| 4,511,906 | 4/1985 | Hara | 346/140 R |

FOREIGN PATENT DOCUMENTS

| | | | |
|---|---|---|---|
| 55-42875 | 3/1980 | Japan | 346/140 R |

OTHER PUBLICATIONS

IBM Technical Disclosure Bulletin, vol. 15, No. 9, 2-73, Greene et al.

*Primary Examiner*—E. A. Goldberg
*Assistant Examiner*—Gerald E. Preston
*Attorney, Agent, or Firm*—Birch, Stewart, Kolasch & Birch

[57] ABSTRACT

An ink liquid reservoir is mounted on a reciprocating carriage in an ink jet system printer of the ink-on-demand type. An opening is formed in a ceiling wall of the ink liquid reservoir for ensuring a smooth supply of the ink liquid to a printer head which is also mounted on the carriage. A plurality of standing plates are disposed in the ink liquid reservoir in a manner that the top free edge of the standing plate is separated from the ceiling wall of the ink liquid reservoir. The standing plates function to minimize the disturbance of the ink liquid contained in the ink liquid reservoir when mechanical vibrations are applied to the ink liquid contained in the ink liquid reservoir due to the movement of the carriage.

16 Claims, 4 Drawing Figures

INK LIQUID BAFFLE-REGULATED RESERVOIR IN AN INK JET SYSTEM PRINTER

BACKGROUND AND SUMMARY OF THE INVENTION

The present invention relates to an ink liquid supply system in an ink jet system printer of the ink-on-demand type.

The present invention relates, more particularly, to an ink liquid reservoir mounted on a carriage in an ink jet system printer of the ink-on-demand type.

In the conventional ink jet system printer, an ink liquid reservoir is disposed at a position separated from a carriage, and a conduit is provided between the ink liquid reservoir and the carriage which supports a printer head. A liquid supply pump system is inevitably required, which makes the ink jet system printer large and complicated.

An ink liquid supply system has been proposed, wherein an ink liquid reservoir is mounted on the carriage. In such a system, attention should be given to the fact that mechanical vibration is applied to the ink liquid reservoir when the carriage performs the reciprocating movement.

Accordingly, an object of the present invention is to provide an ink liquid reservoir mounted on a carriage, the ink liquid reservoir ensuring a stable operation even though mechanical vibration is applied to the ink liquid reservoir due to the movement of the carriage.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an ink liquid reservoir is mounted on a carriage and is connected to a printer head. An opening is formed in the ceiling wall of the ink liquid reservoir to ensure a stable ink liquid supply from the ink liquid reservoir to the printer head. A plurality of partition walls are secured to the bottom wall of the ink liquid reservoir in a manner such that the free ends of the respective partition walls are spaced apart from the ceiling wall of the ink liquid reservoir. The thus provided partition walls function to damp the disturbance of the ink liquid when the carriage is driven to travel.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
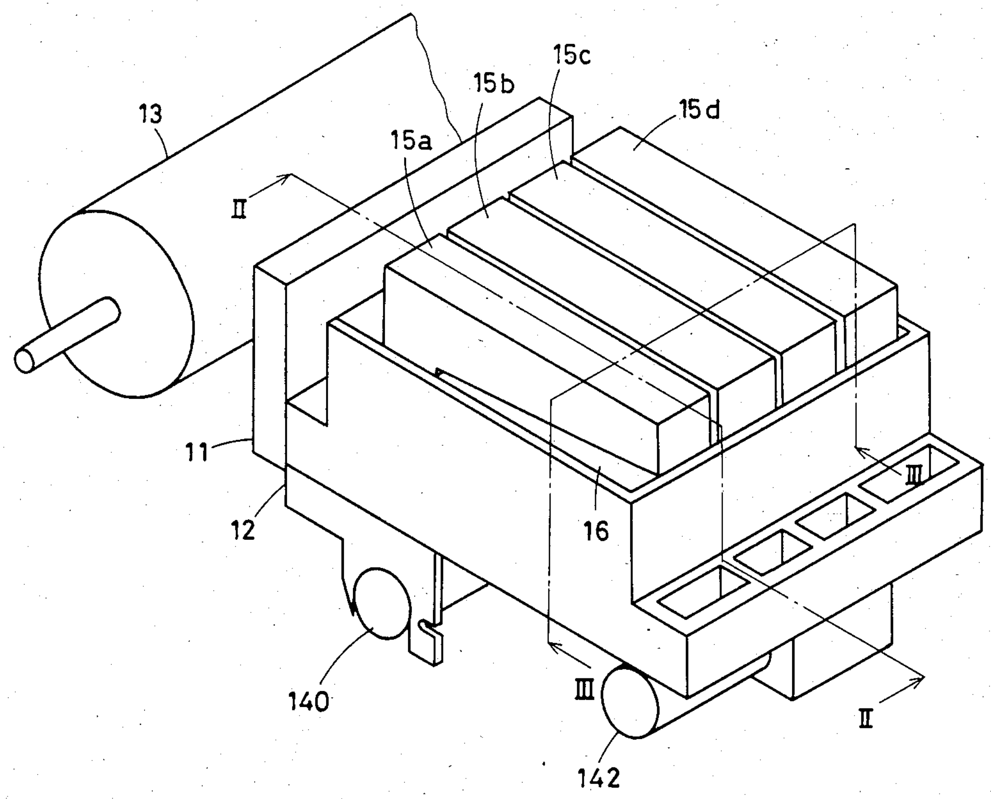
FIG. 1 is a perspective view of a carriage in an ink jet system printer which includes an embodiment of an ink liquid reservoir of the present invention.

An ink jet system printer of the ink-on-demand type generally includes a printer head 11 which is mounted on a carriage 12 to confront a platen 13. A pair of shafts 140 and 142 are disposed along the platen 13 in order to slidably support the carriage 12. The carriage 12 is connected to a drive mechanism (not shown), and is driven to reciprocate along the shafts 140 and 142.

In accordance with the present invention, an ink liquid reservoir 16 is mounted on the carriage 12. Furthermore, the ink liquid reservoir 16 is divided into four chambers. Four ink liquid cartridge **15*a*, 15*b*, 15*c* and 15*d* are mounted on the respective chambers of the ink liquid reservoir 16 in order to supply ink liquid 150 of different color (magenta, yellow, cyan, and black) to the respective chambers formed in the ink liquid reservoir 16**.

Figure 2:
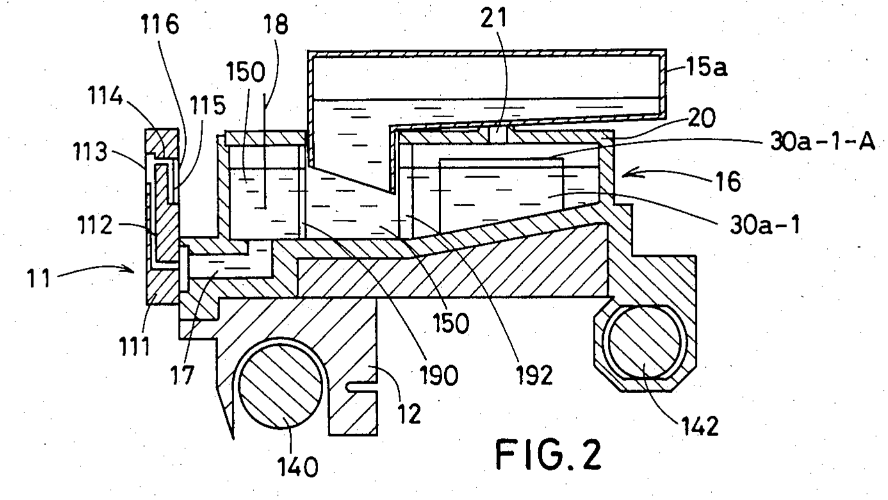
FIG. 2 is a sectional view taken along line II—II of FIG. 1.

FIG. 2 shows a construction related to one of the four chambers of the ink liquid reservoir 16, to which the ink liquid cartridge **15*a* is connected. The printer head 11 includes a base member 111, an ink liquid passage 112, a nozzle slit portion 113, an orifice 114 and a pressure chamber 115. The nozzle slit portion 113 is communicated to the ink liquid reservoir 16 via the ink liquid passage 112 and an ink liquid passage 17. The nozzle slit portion 113 is further communicated to the pressure chamber 115 through the orifice 114. An electromechanical transducer 116 is disposed at the back of the pressure chamber 115 in order to emit ink droplets from the nozzle slit portion 113** at a desired time.

An ink level sensor 18 is disposed in the ink liquid reservoir 16 in order to detect the amount of the ink liquid 150 contained in the ink liquid reservoir 16 through the use of the conductivity of the ink liquid 150. Guide plates 190 and 192 are provided in the ink liquid reservoir 16 for guiding the ink liquid cartridge **15*a*. The ink liquid reservoir 16 includes a ceiling wall 20 in which an opening 21 is formed for ensuring a smooth supply of the ink liquid 150 to the nozzle slit portion 113. That is, the opening 21 functions to prevent the ink liquid reservoir 16** from becoming a negative pressure.

Figure 3:
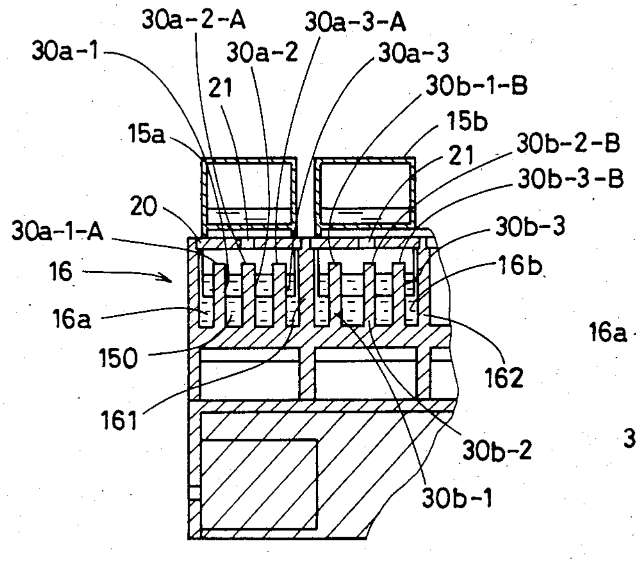
FIG. 3 is a sectional view taken along line III—III of FIG. 1.

As already discussed above, the ink liquid reservoir 16 is divided into four chambers **16*a*, 16*b*, 16*c* and 16*d* (FIG. 3 shows the chambers 16*a* and 16*b*) by three walls 161, 162 and 163 (FIG. 3 shows the walls 161 and 162). In each of the chambers 16*a*, 16*b*, 16*c* and 16*d*, three plates 30*a*-1, 30*a*-2 and 30*a*-3 (30*b*-1, 30*b*-2, 30*b*-3, 30*c*-1, 30*c*-2, 30*c*-3, 30*d*-1, 30*d*-2, 30*d*-3) are secured to the bottom wall of the ink liquid reservoir 16 in a manner that each of the plates 30*a*-1, 30*a*-2 and 30*a*-3 has a free top end 30*a*-1-A (30 a-2-A, 30*a*-3-A) which is separated from the ceiling wall 20 of the ink liquid reservoir 16**.

The ink liquid 150 disposed in the ink liquid reservoir 16 is supplied to the pressure chamber 115 through the ink liquid passage 112 by means of the capillarity. The ink liquid 150 is maintained at a desired level in the ink liquid reservoir 16 as long as the ink liquid cartridge **15*a* (15*b*, 15*c* or 15*d*) contains a sufficient amount of the ink liquid 150. When the ink liquid 150 disposed in the ink liquid reservoir 16 becomes less than a desired level, the ink level sensor 18** electrically detects the condition and develops a warning signal.

Figure 4:
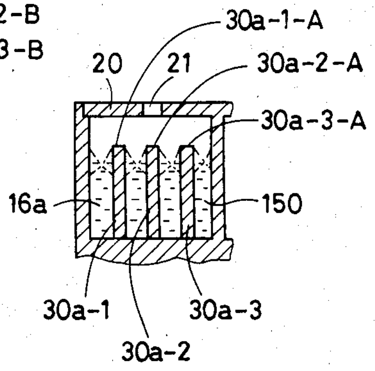
FIG. 4 is a schematic sectional view showing an operational mode of the ink liquid reservoir of the present invention.

To conduct a printing operation, the carriage 12 is driven to reciprocate along the shafts 140 and 142. A driving signal is applied to the electromechanical transducer 116 to emit the ink droplets from the nozzle slit portion 113 at a desired timing. When the carriage 12 travels on the shafts 140 and 142, mechanical vibrations are inevitably applied to the ink liquid 150 disposed in the ink liquid reservoir 16 which is mounted on the carriage 12. FIG. 4 shows the disturbance of the ink liquid 150 contained in the chamber 16a of the ink liquid reservoir 16. Because of the provision of the three plates 30a-1, 30a-2 and 30a-3, the ink liquid surface never reaches the ceiling wall 20 of the ink liquid reservoir 16 due to the viscosity friction created between the ink liquid 150 and the three plates 30a-1, 30a-2 and 30a-3. That is, the opening 21 will not be blocked by the ink liquid 150 even though the mechanical vibrations are applied to the ink liquid reservoir 16. Moreover, there is no possibility that the ink liquid 150 is developed through the opening 21 while the carriage 12 performs the reciprocating movement.

Although three plates are disposed in the respective chambers of the ink liquid reservoir 16, the number of the plates can be determined in accordance with the size of the ink liquid reservoir 16, the travelling speed to the carriage 12, and the viscosity of the ink liquid 150.

The invention being thus described, it will be obvious that the same way may be varied in many ways. Such variations are not to be regarded as a departure from the spirit and scope of the invention, and all such modifications are intended to be included within the scope of the following claims.

What is claimed is:

1. An ink liquid supply system for an ink jet system printer which includes a printer head mounted on a reciprocating carriage, said ink liquid supply system comprising: an ink liquid reservoir mounted on said reciprocating carriage, said ink liquid reservoir comprising:

a ceiling wall provided with an opening exposed to the atmosphere for introducing air into said ink liquid reservoir; at least one plate disposed in said ink liquid reservoir in a manner such that the plate stands in the ink liquid reservoir, the free top edge of the plate being separated from said ceiling wall of said ink liquid reservoir; and an ink liquid cartridge in liquid communication with said reservoir mounted on top of said reservoir wherein ink feeds from said cartridge into said reservoir when the ink level in said reservoir is lowered.

2. The ink liquid supply system of claim 1, wherein said ink liquid reservoir further includes:

an ink liquid level sensor merged in ink liquid contained in said ink liquid reservoir.

3. The ink liquid supply system of claim 1, wherein said ink liquid cartridge has a spout which extends downwardly into said reservoir.

4. An ink liquid system for an ink system printer, comprising:

a reciprocating carriage;

a printer head mounted on said reciprocating carriage;

an ink liquid reservoir mounted on said reciprocating carriage, having a ceiling wall provided with a first opening exposed to the atmosphere and a second opening;

means connected to said printer head and said ink liquid reservoir for transmitting ink from said ink liquid reservoir to said printer head;

a plate disposed in said ink liquid reservoir in a manner such that said plate stands in said ink liquid reservoir and a free top end of said plate is separated from said ceiling wall of said ink liquid reservoir, said plate being capable of dampening the disturbance of the ink liquid upon movement of said reciprocating carriage; and a removable ink cartridge mounted on said ink liquid reservoir, a portion of said removable ink cartridge being disposed over said first opening and a portion of said removable ink cartridge downwardly extending into said second opening.

5. The ink liquid supply system for an ink system printer according to claim 4, wherein the means for transmitting ink from said ink liquid reservoir to said printer head comprises an orifice.

6. The ink liquid supply system for an ink system printer according to claim 4, wherein said ink liquid supply system comprises a plurality of said ink liquid reservoirs.

7. The ink liquid supply system for an ink system printer according to claim 6, wherein a plurality of removable ink cartridges containing ink of different colors are mounted on each of said ink liquid reservoirs, respectively.

8. The ink liquid supply system for an ink system printer according to claim 4, wherein said ink liquid reservoir includes an ink liquid level sensor.

9. The ink liquid supply system for an ink system printer according to claim 4, wherein said plate disposed in said ink liquid reservoir is spaced from the sidewalls of said reservoir and is disposed in a direction perpendicular to the direction of motion of said reciprocating carriage.

10. The ink liquid supply system for an ink system printer according to claim 4, wherein said removable ink cartridge has a spout that can be fitted to extend downwardly into said second opening.

11. The ink liquid supply system for an ink system printer according to claim 4, wherein said printer head comprises:

a base member;

a nozzle slit portion;

an orifice, one end of said orifice being connected to said ink liquid reservoir;

an ink liquid passage, one end of said ink liquid passage being connected to said nozzle slit portion and the other end being connected to said orifice;

a pressure chamber;

a second orifice, one end of said second orifice being connected to said nozzle slit portion and the other end being connected to said pressure chamber; and an electromechanical transducer disposed at the back of said pressure chamber.

12. The ink liquid supply system for an ink system printer according to claim 10, wherein guide plates are provided in the ink liquid reservoir for guiding said spout of said removable ink liquid cartridge.

13. The ink liquid supply system for an ink system printer according to claim 10, wherein said removable ink cartridge comprises an ink chamber, a spout portion arranged on the bottom surface of said ink chamber and extending downwardly into said second opeing, and means for spacing the bottom of the ink cartridge from said first opening to allow air to flow into said opening.

14. An ink liquid supply system for an ink jet system printer which includes a printer head mounted on a reciprocating carriage, said ink liquid supply system comprising:

an ink liquid reservoir mounted on said reciprocating carriage, said ink liquid reservoir comprising:

a ceiling wall provided with an opening exposed to atmosphere for introducing air into said ink liquid reservoir and sidewalls; and at least one plate having a free top edge and a free side disposed in said ink liquid reservoir in a manner such that the plate stands in the ink liquid reservoir, the free top edge of the plate being separated from said ceiling wall of said ink liquid reservoir and the sides of said plate being separated from a sidewall of said reservoir.

15. The ink liquid system of claim 14, wherein said plate has two free sides, each of said free sides being spaced from a corresponding sidewall of said reservoir.

16. The ink liquid system of claim 15, wherein the bottom of said reservoir slopes downwardly toward an ink liquid passage which leads to said printer head.

* * * * *